United States Patent Office 3,702,255
Patented Nov. 7, 1972

3,702,255
KYNURENINE DERIVATIVES AS SWEETENING AGENTS
John W. Finley, Walnut Creek, Calif., assignor to the United States of America as represented by the Secretary of Agriculture
No Drawing. Filed Aug. 21, 1970, Ser. No. 66,083
Int. Cl. A23l 1/26
U.S. Cl. 99—141 A          8 Claims

ABSTRACT OF THE DISCLOSURE

Edible materials, particularly food products, are sweetened by the incorporation of a kynurenine derivative responding to either of the following formulas:

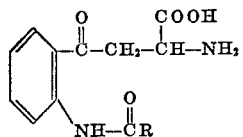

wherein R is H or lower alkyl.

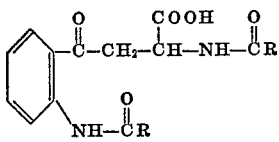

wherein each R is H or lower alkyl.

---

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the art of imparting sweetness to edible materials, especially food products. More particularly, the invention is concerned with the use of certain kynurenine derivatives for such purposes. The objects of the invention also include methods for synthesizing said derivatives. Additional objects of the invention will be evident from the following description wherein parts and percentages are by weight unless otherwise specified.

The kynurenine derivatives used in accordance with the invention are those responding to either of the following formulas:

I.
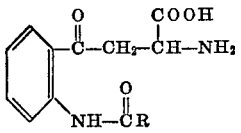

wherein R is hydrogen or a lower alkyl radical.

II.
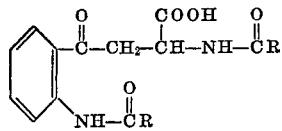

wherein each R is hydrogen or a lower alkyl radical.

It may be noted at this point that in naming derivatives of kynurenine, the nitrogen of the amino group directly attached to the benzene ring is referred to as N', the nitrogen of the other amino group is referred to as $N^\alpha$.

I have found that the compounds of the invention exhibit a distinguishing characteristic in that they are very sweet, in particular, they are about 25 to 50 times sweeter than sucrose. This is a surprising discovery since sweetness is not a general characteristic of kynurenines as a class. Indeed, compounds which differ from those of the invention by the nature of the substituents on the basic kynurenine structure are tasteless or very sour (astringent). For example, kynurenine itself, which has the structure:

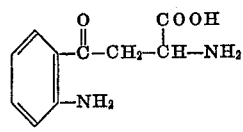

has an astringent taste.

Because of their extraordinary sweetness, the compounds of the invention are useful as sweetening agents for foods and edible products of all kinds. It has been found, moreover, that for this sweetness to subsist, various elements in the structure are critical. One item is that the two side chains must be in ortho (1,2) relationship. Another is that the amine group directly linked to the benzene ring must be acrylated. Thus, kynurenine which contains a non-acrylated amino group attached to the benzene ring is not sweet but has an astringent taste.

It may be noted that the compounds of the invention have certain structural features in common with tryptophan which has the formula:

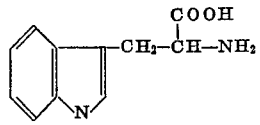

Tryptophane exists in two optical forms, D and L. It is known that D-tryptophane is about 35 times sweeter than sucrose. On the other hand, L-tryptophane is rather bitter and in the racemic mixture of the two forms of tryptophane this, bitter flavor is dominant so that D,L-tryptophane is unsuitable as a sweetener. No such problem exists with the compounds of the invention. Although kynurenine and its derivatives can exist in different optical forms, the compounds of the invention in the racemic (D,L) form exhibit the high degree of sweetness as hereinabove mentioned and therefore are useful in such optically-inactive form.

The compounds of the invention can be prepared by known methods or by a novel method hereinafter disclosed. In one known technique D,L-tryptophane is oxidized with $H_2O_2$ to yield N-formyl kynurenine. Other methods of synthesis are described by Dalgliesh, Jour. Chem. Soc. (London), 1952, pp. 137–141.

The new method involves the following series of steps: Ortho-chloroaniline is converted into the corresponding Grignard reagent. This is reacted with maleic anhydride to produce an ortho-maleyl derivative of aniline. This in turn is reacted with HBr to saturate the double bonds of the side chain, and then the bromine is replaced by $NH_2$ through reaction with $NH_4OH$, thus producing kynurenine. The last can be readily formed into the acylated derivatives of Formulas I and II by known reactions such as those of Dalgliesh.

As noted above, the kynurenine derivatives of the invention are very sweet. Moreover, they are soluble in water and stable, even in aqueous solution. As a result, they are useful for sweetening all types of materials which are intended for consumption or at least for contact with the mouth of the user, such materials being herein generically designated as edible materials. Typical illustrative examples of edible materials which may be sweetened with the compounds of the invention are fruits; vegetables; juices or other liquid preparations made from fruits or vegetables; meat products, particularly those conventionally treated with sweetened liquors, i.e., bacon and ham; milk products such as chocolate dairy drinks; egg products such as nogs, custards, angel food mixes; salad dressings; pickles and relishes; ice creams, sherbets, and ices; ice milk produsts; bakery products; icings; confections and confection toppings, syrups, and flavors; cake and pastry mixes; beverages such as carbonated soft drinks, fruit ades; wines; dietary-type foods; cough syrups and other medicinal preparations intended for oral administration; dental preparations such as pastes, powders, foams and denture-retaining adhesives; mouth washes and similar oral antiseptic liquids; tobacco products; adhesives for gumming stamps, envelopes and labels, etc. In using the compounds of the invention, they are incorporated in the material to be sweetened in the amount required to attain the desired level of sweetness. Ordinarily, because of their high sweetness they are used in a lesser concentration than one would use sucrose. For instance, they are generally used in a concentration of about 0.5% or less, usually less than 0.2%. It is obvious, however, that there is nothing critical about the concentration of the kynurenine derivative which is used; it is simply a matter of attaining a desired sweetness level appropriate to the material in question. Moreover, the technique of sweeting materials with the compounds of the invention offers no difficulty as the selected compound is simply incorporated with the material to be sweetened. The kynurenine derivatives may be added directly to the material or they may be first incorporated with a diluent to increase their bulk so that small amounts of the compounds may be metered into the material. As diluents one may use liquid or solid carriers such as water, glycerol, starch, sorbitol, salt, sugar, citric acid, or other non-toxic substance compatible with the material to be sweetened.

The invention is further demonstrated by the following illustrative examples.

Example 1.—Synthesis of N'-formyl kynurenine

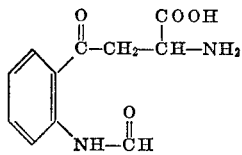

Twenty-five grams of D,L-tryptophane were dissolved in water (about 1000 ml.), the solution adjusted to pH 2.0 by addition of hydrochloric acid, and filtered. An equimolar quantity of hydrogen peroxide (13.8 g. of 30% $H_2O_2$ solution) was added to the filtered solution. After standing for 30 minutes at room temperature, conc. $NH_4OH$ was added until complete precipitation of the product was obtained. The precipitate was collected by centrifugation, then washed thoroughly with cold distilled water. The washed precipitate was then dissolved in hydrochloric acid, and conc. $NH_4OH$ added to the solution until complete precipitation of the product was obtained. The precipitate was collected, washed with cold water, then dissolved in conc. $NH_4OH$ at pH 9.0. This solution was frozen and dried under vacuum. After drying, the material was washed three times with 200-ml. portions of diethyl ether, yielding about 20 g. of N-formyl kynurenine.

Aqueous solutions of N'-formyl kynurenine at different concentrations and aqueous solutions of sucrose at different concentrations were assessed for sweetness by a panel of twelve persons. The panel came to the conclusion that a 0.15% solution of N'-formyl kynurenine was equivalent in sweetness to a 5% solution of sucrose.

In another series of similar tests it was found that solutions of N'-formyl kynurenine at concentrations of 1.6%, 0.8%, and 0.4% were judged to be sweeter than a 10% solution of sucrose.

Example 2.—Preparation of N'-acetyl kynurenine

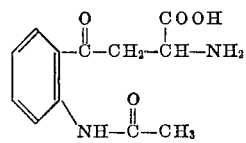

N'-formyl kynurenine was dissolved in 90% acetic acid and to this solution was added two volumes of acetic anhydride. After standing for about 2 hours, the product was precipitated by addition of ether, the precipitate being collected and washed with ether, yielding the desired N'-acetyl kynurenine. It was found that this compound was approximately 50 times sweeter than sucrose.

Example 3.—Preparation of kynurenine

The following reaction scheme was carried out in this synthesis:

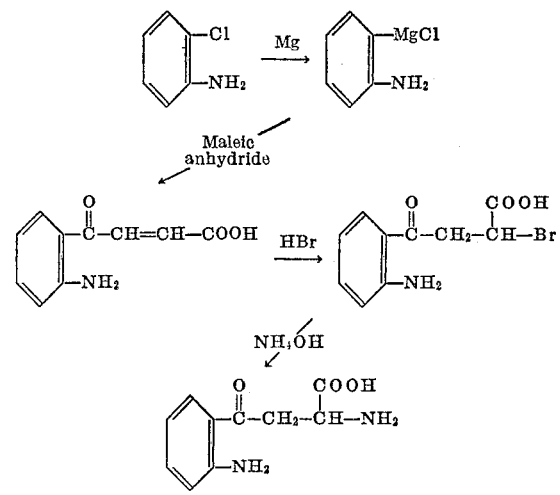

The following ingredients were heated under reflux for about 2 hours to produce the Grignard reagent:

| | G. |
|---|---|
| o-Chloroaniline | 40 |
| Tetrahydrofuran | 40 |
| Bromoethane | 3 |
| Magnesium | 8 |

In the next step, 40 g. of maleic anhydride was added to the reaction mixture containing the Grignard reagent, and the system refluxed for 30 minutes. The reaction mixture was then filtered. The filtrate was diluted with 250 ml. of water and extracted with an equal volume of ether. The aqueous solution was then treated with 2 N NaOH (about 50 ml.) to precipitate the maleyl derivative which was collected and rinsed with distilled water.

In the next step the maleyl derivative was dissolved in one liter of 4% HBr and allowed to stand at room temperature for 30 minutes to form the bromo-succinyl derivative.

In the next step, one liter of conc. $NH_4OH$ was added to the reaction mixture from the previous step and the reaction system allowed to stand overnight at room temperature. The next day the precipitate was separated and re-precipitated from 50% formic acid by addition of ether. The final yield of kynurenine was 48.5% (31.5 g.).

Having thus described the invention, what is claimed is:

1. A method for sweetening a food which comprises adding thereto an effective amount of a compound of the formula:

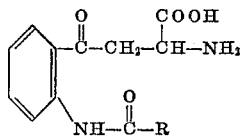

wherein R is hydrogen or a lower alkyl radical.

2. The method of claim 1 wherein the compound is N'-formyl kynurenine.

3. The method of claim 1 wherein the compound is N'-acetyl kynurenine.

4. A method for sweetening a food which comprises adding thereto an effective amount of a compound of the formula

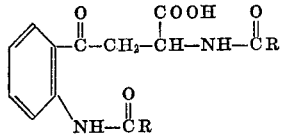

wherein each R is hydrogen or a lower alkyl radical.

5. A composition comprising (a) a food and, as a sweetener therefor, (b) a compound of the formula:

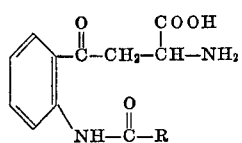

wherein R is hydrogen or a lower alkyl radical.

6. The composition of claim 5 wherein the compound is N'-formyl kynurenine.

7. The composition of claim 5 wherein the compound is N'-acetyl kynurenine.

8. A composition comprising (a) a food and, as a sweetener therefor, (b) a compound of the formula:

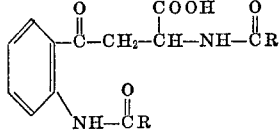

wherein each R is hydrogen or a lower alkyl radical.

References Cited

UNITED STATES PATENTS

| | | | |
|---|---|---|---|
| 3,351,629 | 11/1967 | Griot | 260—518 R |
| 3,492,131 | 1/1970 | Schlatter | 99—141 A |
| 3,646,061 | 2/1972 | Maeda et al. | 260—518 R |

OTHER REFERENCES

Dalgliesh, C. E., Jour. Chem. Society (London) 1952, pp. 137–141.

RAYMOND N. JONES, Primary Examiner

U.S. Cl. X.R.

424—54